(12) United States Patent
Vermani et al.

(10) Patent No.: US 8,923,215 B2
(45) Date of Patent: Dec. 30, 2014

(54) METHOD AND APPARATUS FOR SCHEDULING TRANSMISSIONS IN SPATIAL DIVISION MULTIPLE ACCESS NETWORK SYSTEMS

(75) Inventors: Sameer Vermani, San Diego, CA (US); Vinay Sridhara, Santa Clara, CA (US); Santosh P. Abraham, San Diego, CA (US); Alok Aggarwal, Foster City, CA (US)

(73) Assignee: QUALCOMM Incorporated, San Diego, CA (US)

(*) Notice: Subject to any disclaimer, the term of this patent is extended or adjusted under 35 U.S.C. 154(b) by 759 days.

(21) Appl. No.: 12/712,974

(22) Filed: Feb. 25, 2010

(65) Prior Publication Data

US 2010/0220601 A1 Sep. 2, 2010

Related U.S. Application Data

(60) Provisional application No. 61/156,341, filed on Feb. 27, 2009.

(51) Int. Cl.
*H04J 11/00* (2006.01)
*H04W 72/04* (2009.01)
*H04W 28/04* (2009.01)
*H04L 1/00* (2006.01)

(52) U.S. Cl.
CPC .......... *H04W 72/046* (2013.01); *H04W 28/04* (2013.01); *H04L 1/0025* (2013.01)

USPC .......................................................... 370/329

(58) Field of Classification Search
USPC ........... 370/329, 312, 319; 375/267, 299, 219
See application file for complete search history.

(56) References Cited

U.S. PATENT DOCUMENTS

| | | | |
|---|---|---|---|
| 8,320,301 B2 * | 11/2012 | Walton et al. ............... 370/328 |
| 2005/0147023 A1 * | 7/2005 | Stephens et al. ............. 370/203 |
| 2007/0049218 A1 | 3/2007 | Gorokhov et al. |
| 2008/0037464 A1 | 2/2008 | Lim et al. |
| 2008/0107085 A1 | 5/2008 | Yoon |
| 2008/0159122 A1 * | 7/2008 | Dor ............................... 370/208 |

FOREIGN PATENT DOCUMENTS

EP 1662677 5/2006

OTHER PUBLICATIONS

International Search Report and Written Opinion—PCT/US2010/025679—International Search Authority, European Patent Office, Dec. 8, 2010.
Taiwan Search Report—TW099105928—TIPO—Feb. 16, 2013.

* cited by examiner

*Primary Examiner* — Phuongchau Ba Nguyen
(74) *Attorney, Agent, or Firm* — Kevin T. Cheatham (57) ABSTRACT

An apparatus for communications including a processing system configured to generate a plurality of spatial streams for communicating with a plurality of nodes, the processing system being further capable of determining an allocation of the spatial streams to each of the nodes based on at least one metric for each of the nodes.

35 Claims, 10 Drawing Sheets

| 502 | 504 | 506 | 508 | 510 | 512 | 514 | 516 |
|---|---|---|---|---|---|---|---|
| FC | Duration/ID | DA (Broadcast) | SA | #STAs per Slot | MAX ID | Bitmap | CRC |

METHOD AND APPARATUS FOR SCHEDULING TRANSMISSIONS IN SPATIAL DIVISION MULTIPLE ACCESS NETWORK SYSTEMS

CLAIM OF PRIORITY UNDER 35 U.S.C. §119

The present Application for Patent claims priority to Provisional Application No. 61/156,341, entitled "Downlink/Uplink SDMA Scheduler Architecture For WLAN Systems" filed Feb. 27, 2009, and assigned to the assignee hereof and hereby expressly incorporated by reference herein.

BACKGROUND

I. Field

The following description relates generally to communication systems, and more particularly to a method and apparatus for scheduling transmissions in Spatial Division Multiple Access (SDMA) network systems.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In communication systems, medium access control (MAC) protocols are designed to operate to exploit several degrees of freedom offered by the air link medium. The most commonly exploited degrees of freedom are time and frequency. For example, in the IEEE 802.11 MAC protocol, the time degree of freedom is exploited through the CSMA (Carrier Sense Multiple Access). The CSMA protocol attempts to ensure that no more than one transmission occurs in a neighborhood of potential high interference. The frequency degree of freedom can be exploited by using different channels.

Recent developments have led to space dimension being a viable option. Spatial Division Multiple Access (SDMA) can be used for improving utilization of the air link by scheduling multiple terminals for simultaneous transmission and reception. Data is sent to each of the terminals using spatial streams. For example, with SDMA, a transmitter forms orthogonal streams to individual receivers. Such orthogonal streams can be formed because the transmitter has several antennas and the transmit/receive channel consists of several paths. The receivers may also have one or more antennas, such as in MIMO or Single Input-Multiple Output (SIMO) antenna systems. In one example, the transmitter may be an access point (AP) and the receivers may be stations (STAs). The streams are formed at the AP such that a stream targeted at a particular STA, for example, may be seen as low power interference at other STAs, which will not cause significant interference and not be ignored.

With multiple STAs and APs capable of simultaneous transmission in the SDMA WLAN system, efficient scheduling for downlink transmissions, which are transmissions from the AP to one or more STAs, and uplink transmissions, which are transmissions from one or more of the STAs to the AP, is desirable. Additional complexities are involved when scheduling simultaneous transmissions to and from multiple STAs; where each STA may have different pathloss and/or Quality of Service (QoS) requirements. Further, as each STA and AP may have different numbers of transmit and receive antennas, complexities added by hardware have to be considered during scheduling.

Consequently, it would be desirable to address one or more of the issues described above.

SUMMARY

The following presents a simplified summary of one or more aspects of a downlink/uplink SDMA scheduler in order to provide a basic understanding of such aspects of the scheduler. This summary is not an extensive overview of all contemplated aspects, and is intended to neither identify key or critical elements of all aspects nor delineate the scope of any or all aspects of the scheduler. Its sole purpose is to present some concepts of one or more aspects in a simplified form as a prelude to the more detailed description that is presented later.

In one aspect of the disclosure, an apparatus for wireless communications includes a processing system configured to generate a plurality of spatial streams for communicating with a plurality of nodes, the processing system being further capable of determining an allocation of the spatial streams to the nodes based on at least one metric for each of the nodes.

In another aspect of the disclosure, an apparatus for wireless communications is provided that includes means for generating a plurality of spatial streams for communicating with a plurality of nodes; and means for determining an allocation of the spatial streams to the nodes based on at least one metric for each of the nodes.

In yet another aspect of the disclosure, a method for wireless communications is provided that includes generating a plurality of spatial streams for communicating with a plurality of nodes; and determining an allocation of the spatial streams to the nodes based on at least one metric for each of the nodes.

In yet another aspect of the disclosure, a computer-program product for communication is provided that includes a machine-readable medium encoded with instructions executable to generate a plurality of spatial streams for communicating with a plurality of nodes; and determine an allocation of the spatial streams to the nodes based on at least one metric for each of the nodes.

In yet another aspect of the disclosure, an access point is provided that includes a plurality of antennas; a processing system configured to generate a plurality of spatial streams for communicating with a plurality of nodes, the processing system being further capable of determining an allocation of the spatial streams to the nodes based on at least one metric for each of the nodes; and a transceiver configured to communicate with the nodes through the antenna.

In accordance with common practice, the drawings may be simplified for clarity. Thus, the drawing may not depict all of the components of a given apparatus (e.g., device) or method.

DETAILED DESCRIPTION

Various aspects of the scheduler are described more fully hereinafter with reference to the accompanying drawings. The various aspects may, however, be embodied in many different forms and should not be construed as limited to any specific structure or function presented throughout this disclosure. Rather, these aspects are provided so that this disclosure will be as thorough and complete as possible. Based on the teachings herein, one skilled in the art should appreciate that that the scope of the scheduler is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the scheduler set forth herein. It should be understood that any aspect of the scheduler described herein may be embodied by one or more elements of a claim.

Various concepts will now be presented for an architecture scheduling downlink and uplink Spatial Division Multiple Access (SDMA) transmissions in a Wireless Local Area Network (WLAN) system. In particular, an architecture for an SDMA scheduler is disclosed that supports the scheduling of simultaneous transmissions to and/or from multiple stations with different pathlosses, QoS requirements, and possibly different numbers of transmit and receive antennas. In one configuration, a two stage scheduler is described, the two stage scheduler having a first, coarse, stage and a second, fine grained, stage.

Figure 1:
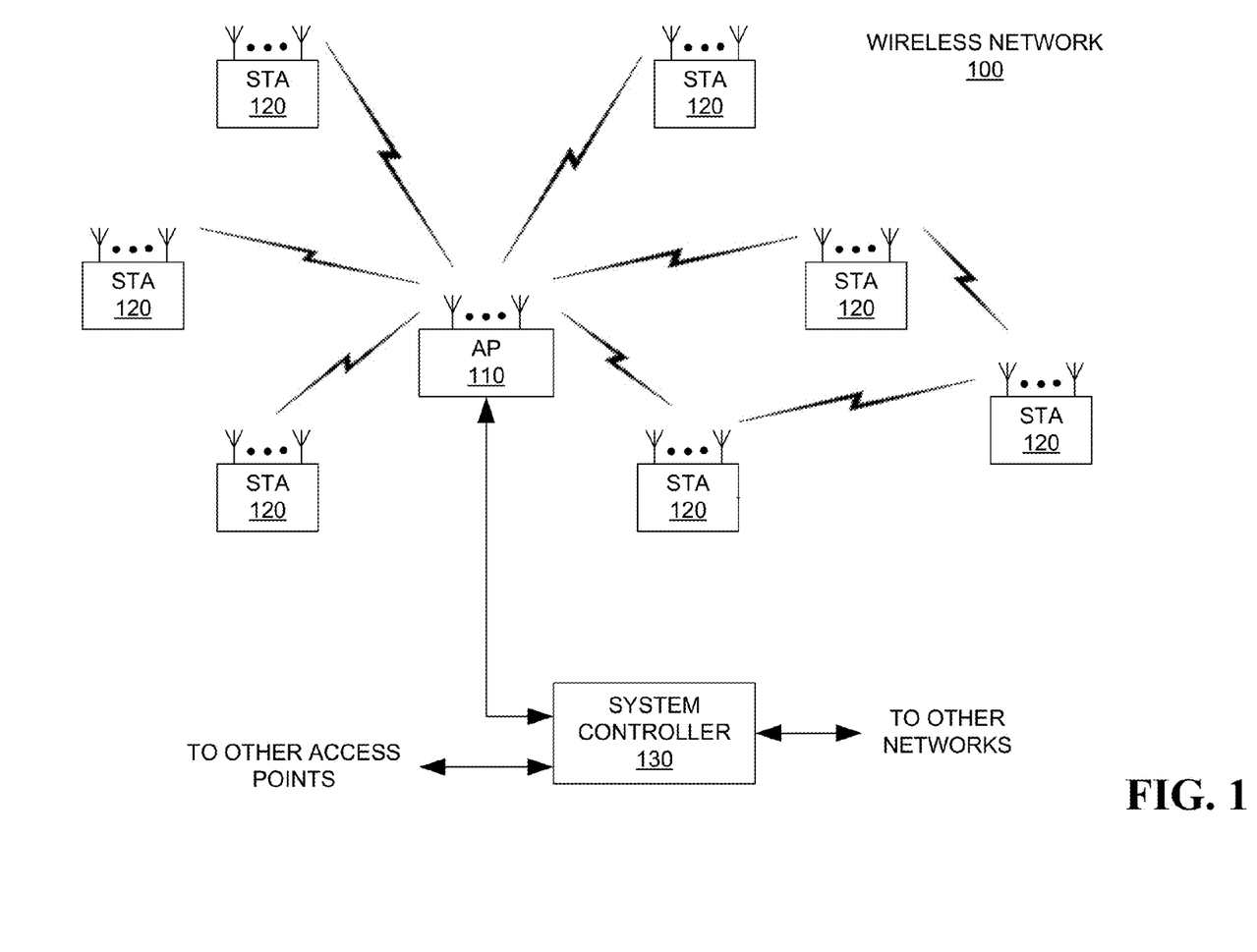
FIG. 1 is a diagram of a wireless communications network in which a downlink/uplink Spatial Division Multiple Access (SDMA) scheduler may be used.
Figure 8:
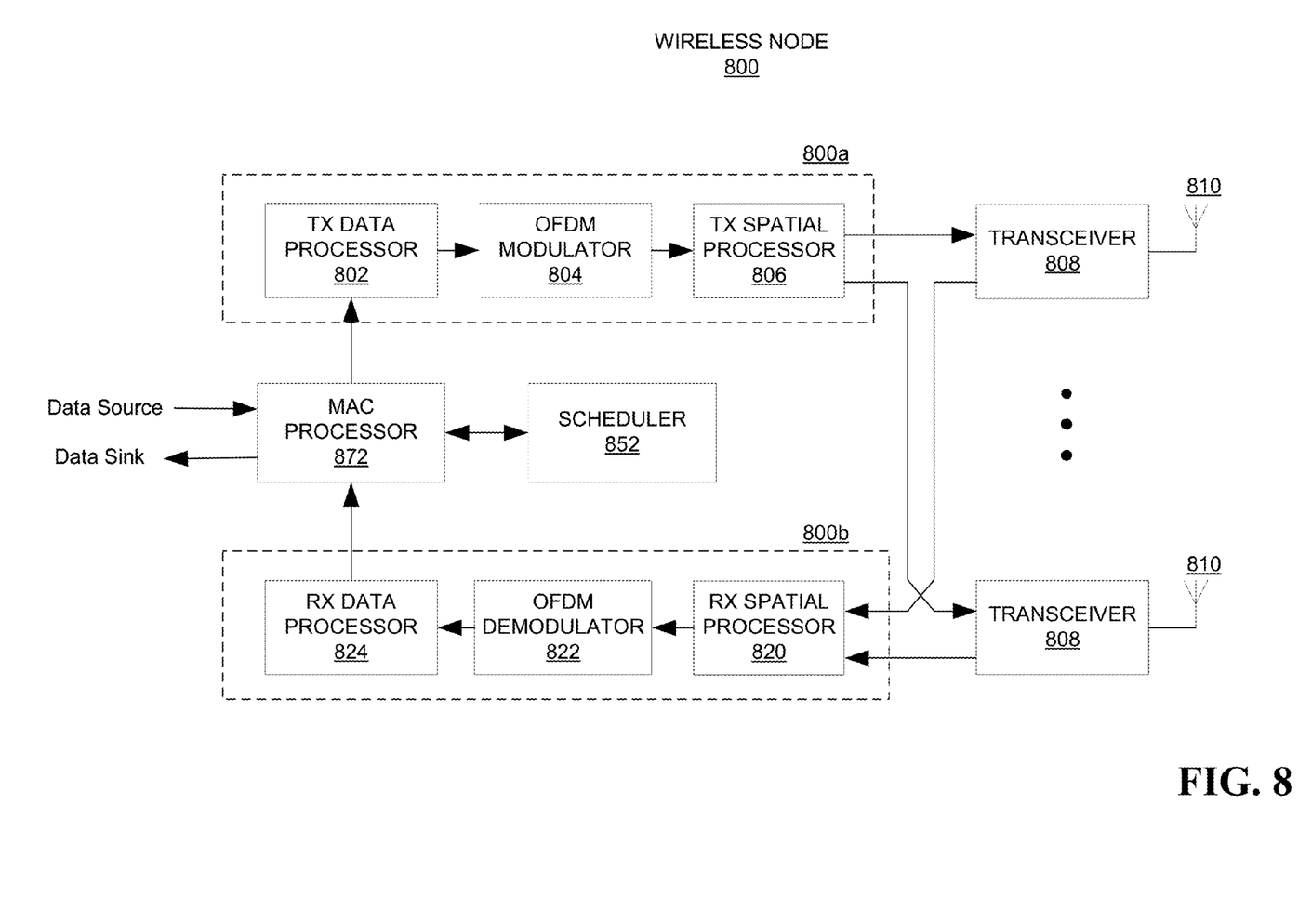
FIG. 8 is a block diagram of an example of a wireless node in the wireless communications network of FIG. 1 that includes the downlink/uplink SDMA scheduler.

These concepts will be presented in the context of several wireless nodes, an example of which is shown in FIG. 8 operating as an AP, in a wireless network, with reference to FIG. 1. However, as those skilled in the art will readily appreciate, the concepts may be extended to other telecommunication apparatuses and networks. The wireless network, which is also referred to herein as a basic service set (BSS) 100, is shown with several wireless nodes, generally designated as an access point (AP) 110 and a plurality of access terminals or stations (STAs) 120. Each wireless node is capable of receiving and/or transmitting. In the detailed description that follows, the term "AP" is used to designate a transmitting node and the term "STA" is used to designate a receiving node for downlink communications, whereas the term "AP" is used to designate a receiving node and the term "STA" is used to designate a transmitting node for uplink communications. However, those skilled in the art will readily understand that other terminology or nomenclature may be used for an AP and/or STA. By way of example, an AP may be referred to as a base station, a base transceiver station, a wireless device, a terminal, a node, a wireless node, an access terminal or an STA acting as an AP, or some other suitable terminology. Similarly, an STA may be referred to as a user terminal, a mobile station, a subscriber station, a wireless device, an access terminal, a terminal, a node, a wireless node, or some other suitable terminology. The various concepts described throughout this disclosure are intended to apply to all suitable apparatuses regardless of their specific nomenclature.

The wireless network 100 may support any number of APs distributed throughout a geographic region to provide coverage for the STAs 120. A system controller 130 may be used to provide coordination and control of the APs, as well as access to other networks (e.g., Internet) for the STAs 120. For simplicity, one AP 110 is shown. An AP is generally a fixed terminal that provides wired network services to STAs in the geographic region of coverage. However, the AP may be mobile in some applications. An STA, which may be fixed or mobile, utilizes the backhaul services of an AP or engages in peer-to-peer communications with other STAs. Examples of STAs include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an AP 110 may communicate with multiple STAs 120 simultaneously using SDMA. SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the STAs 120 with different spatial signatures, which enables each STA 120 to recover the data stream destined for that STA 120. On the uplink, each STA 120 transmits a spatially precoded data stream, which enables the AP 110 to identify the source of each spatially precoded data stream. It should be noted that although the term "precoding" is used herein, in general, the term "coding" may also be used to encompass the process of precoding, encoding, decoding and/or postcoding a data stream.

One or more STAs 120 may be equipped with multiple antennas to enable certain functionality. With this configuration, for example, multiple antennas at the AP 110 may be used to communicate with a multiple antenna STA to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe STAs that also support MIMO technology, the AP 110 may also be configured to support STAs that do not support MIMO technology. This approach may allow older versions of STAs (i.e., "legacy" terminals) to remain deployed in a wireless network, extending their useful lifetime, while allowing newer MIMO STAs to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard. Further, using MIMO technology, an AP may communicate with multiple STAs simultaneously using SDMA.

Figure 2:
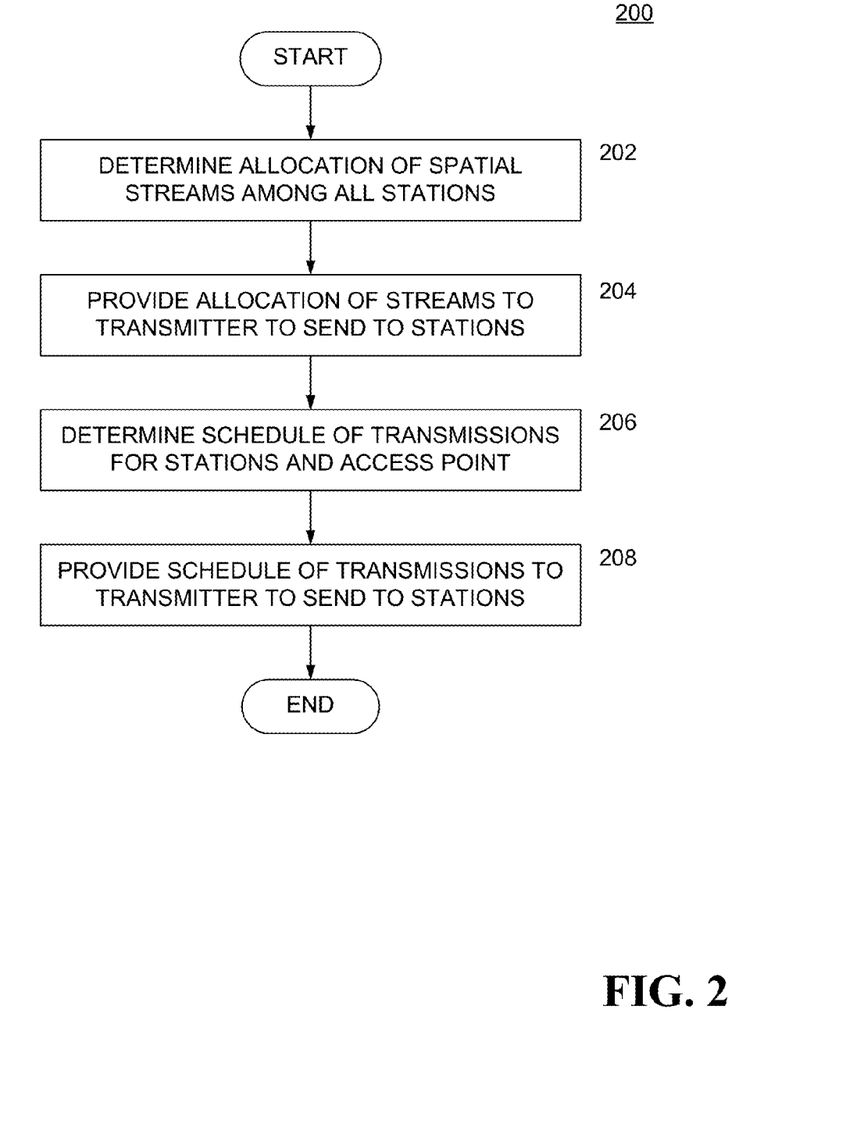
FIG. 2 is a flow diagram illustrating an overview of the operation of a downlink/uplink SDMA scheduler in the wireless communications network of FIG. 1.

FIG. 2 illustrates an overview of a scheduling process 200 for scheduling downlink/uplink SDMA transmissions, where SDMA transmissions may be scheduled using a two-stage, coarse/fine grain scheduling approach. As described herein, scheduling of SDMA transmissions between the AP and its associated STAs is performed by a scheduler in the AP. However, those skilled in the art would understand the described concepts apply to other network topologies where any node can perform the scheduling process.

In a first stage, in step 202, the scheduling process 200 determines an allocation of spatial streams to each STA. As further described herein, during the allocation determination, the coarse scheduling stage determines an initial estimate of the rate requirements for each STA. The coarse scheduling stage also determines which STAs need to transmit using a beam-forming approach and which need to transmit using SDMA. The number of spatial streams allocated to each STA for the STAs that will be transmitting using SDMA will be determined during the coarse scheduling stage.

Once the spatial stream allocation has been determined, operation of the scheduler, in accordance with the scheduling process 200, continues with step 204, where the scheduler will provide the allocation of the spatial streams to a transmitter in the AP so that it may be properly formatted and transmitted to the STAs in an allocation message. As part of the allocation message, also referred to as a frame, the scheduler may also include a request that each STA that is receiving an allocation provide certain information as feedback to allow the scheduler to fine-tune the schedule so as to optimize the use of network resources.

After the coarse scheduling stage of the scheduling process 200, a second stage continues with step 206, which includes the fine grain scheduling stage. During this step, as further described herein, the scheduler determines the assignment of power and beam-forming vectors for each spatial stream. The fine grain scheduling stage also determines a Modulation Coding Scheme (MCS) to be used during the communication process. In one example, the determination of the MCS is based on the post-processing determination of a Signal-to-Interference-plus-Noise-Ratio (SINR).

Once the scheduling of transmissions has been determined, operation of the scheduler in accordance with the scheduling process 200 continues with step 208, where the scheduler will provide the schedule of transmissions of the spatial streams to the transmitter in the AP so that it may be properly formatted and transmitted to the STAs in a scheduling message. The AP and the STAs may then engage in an SDMA transmission operation in accordance with the determined schedule of transmissions.

Before describing the various aspects of the scheduler, as embodied in a wireless node operating as an AP, examples of the various messages, or frames that may be used in the operation of the scheduler will now be described. In general, these frames provide a mechanism for the AP to communicate with the STAs. As disclosed above, and further detailed herein, the scheduler requires certain information regarding and related to the STAs, including information about whether a particular STA has data to transmit and what type of data it needs to transmit. Once this information has been collected, the scheduler may consider the environment, such as the channel state information (CSI), under which the AP will be communicating with the STA to fine-tune the schedule for transmission. It should be noted that as the AP controls the schedule of transmission, the scheduler may be used to schedule both downlink transmissions, i.e., transmissions from the AP to the STA, and uplink transmissions, i.e., transmissions from the STA to the AP.

Obtaining accurate CSI is a valuable part of the SDMA protocol as spatial streams are formed such that a stream targeted at a particular STA, for example, are seen as low power interference at other STAs. In order to form these non-interfering streams, a transmitting node such as the AP needs to determine the CSI related to each of the receiving STAs. One approach is to collect information about the channel from the STAs, referred to as Channel Quality Indicators (CQI), and then determining the CSI.

In one aspect of the disclosure, the message formats further described herein include request and response message pairs, with the request message communicating certain scheduling information as determined by the scheduler along with the request for the CQI. For example, during downlink transmissions, the AP will first determine the state of the channel of transmission to the STAs (i.e., the environment of the wireless medium) by requesting that the STAs with which it will communicate transmit certain metrics about those STAs. The STAs will respond to the request message with a message referred to as a sounding frame. During uplink transmissions, the AP will also provide a mechanism for the STAs to request an uplink operation and provide CQI as well.

In one aspect of the process for determining CSI, the AP sends out a request message indicating that the CQI needs to be estimated. The request message is sent to a set of STAs that are potential SDMA transmission recipients. This message is referred to as a Training Request Message (TRM). Training may not be necessary every time that data is to be transmitted to the STA by the AP. That is, in many cases, the relevant information will change slowly in the network so that updates can be made less frequently. However, some form of training will typically have to be performed at least every so often so that the information used to, for example, generate the beams, select appropriate beams, communicate with the user devices, etc. is current.

In response to the request from the AP, the STAs may transmit a training response. The training response may simply be, for example, an acknowledgement of the receipt of the training request. In another approach, the training response may include a number of training symbols for use in training the corresponding channel. In at least one implementation, it may be desirable to allow legacy user devices (e.g., a user device following IEEE 802.11a, g, etc.) to be part of an SDMA-based cell. In such a case, the training request may include any valid packet in the legacy protocol that solicits a response. For example, a zero-length (null) packet may be transmitted to each user device in the selected orthogonal set for which a legacy type acknowledgement packet will be returned as the training response. Other types of training request and training response signals may alternatively be used. In the example described herein, the response is referred to as a sounding frame.

Figure 3:
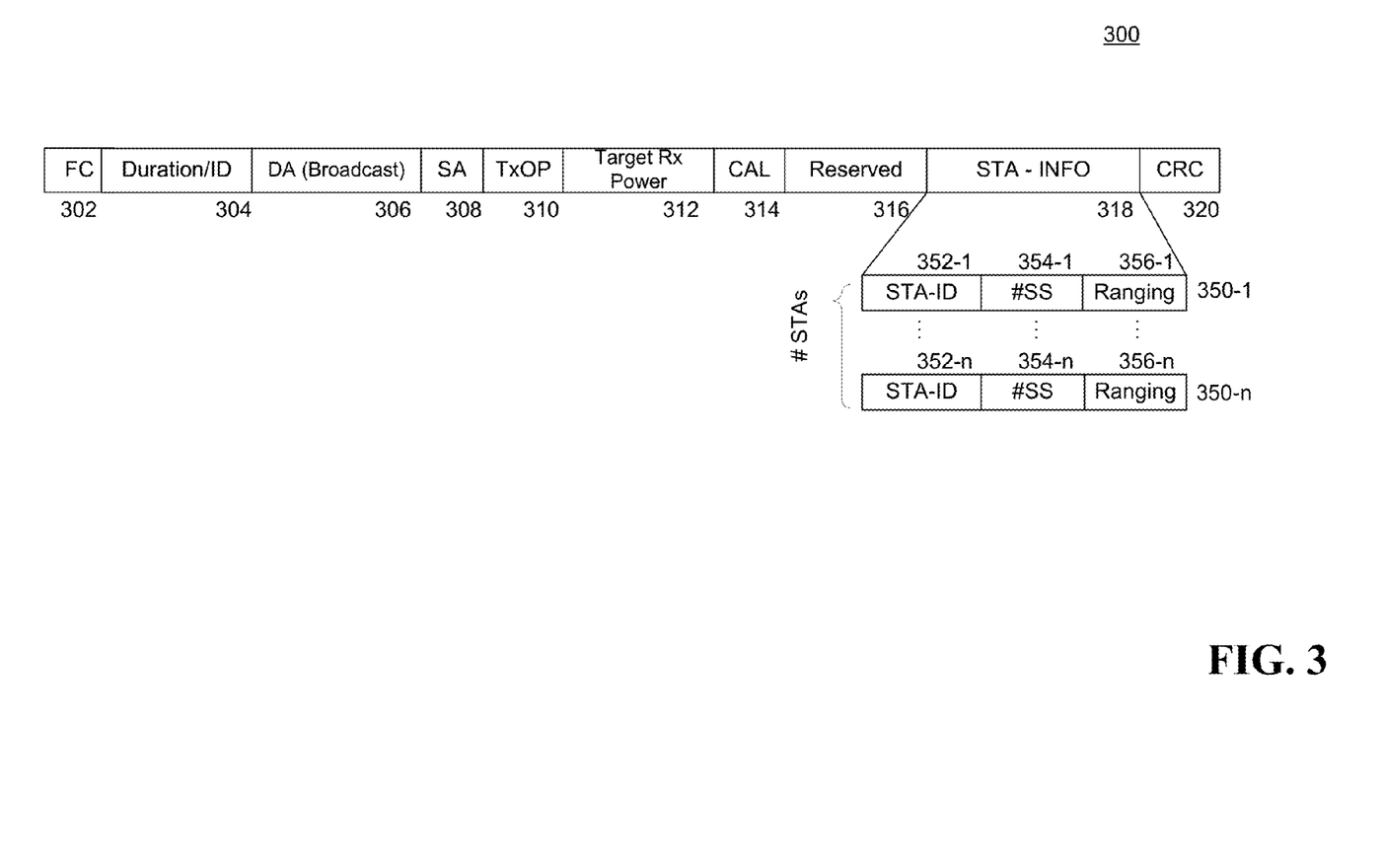
FIG. 3 is a diagram of an example format of a Training Request Message (TRM) frame configured in accordance with one aspect of the disclosure.

An example of the format of the TRM is shown by a TRM frame 300 in FIG. 3. The TRM frame 300 contains an STA information (STA-INFO) field 318 for a plurality of STAs 350-1 to 350-n, respectively, that includes corresponding fields STA-ID fields 352-1 to 352-n, which list the STAs 120 for which the CSI is to be determined; number of spatial streams (#SS) fields 354-1 to 354-n, which identify the number of spatial streams assigned to each STA 120; and ranging information fields 356-1 to 356-n, which are used to ensure that responses arrive time aligned at the AP 110 to ensure accurate joint channel estimation.

The TRM 300 also contains a target Rx Power field 312, which is the Rx power at which an STA's sounding frame should be received at the AP 110. In addition, the TRM 300 also includes a calibration bit 314 that is used to initiate an integrated downlink calibration procedure. Calibration is invoked at relatively large intervals to enable to AP 110 to update correction factors to be applied to the channel estimates.

In one aspect of the disclosure of the TRM, each TRM such as the TRM 300 is transmitted at a fixed transmit power since the STAs 120 use the transmit power of the TRM to estimate path loss and set a transmit power for the uplink sounding frame. The TRM 300 contains a legacy MAC header with the destination address set to the broadcast address in a Destination Address (DA (Broadcast)) field 306. The destination address could also be set to a predefined multicast address. The transmission of each TRM is performed using backoff procedures, and in one aspect of the TRM, the transmission may be performed using the procedures defined in the IEEE 802.11 MAC protocols for contention-based access.

A Duration/ID field 304 in the MAC header is set such that the entire SDMA transmission and the Block ACK reception are accounted for in duration. In one aspect of the process, each TRM such as the TRM 300 is transmitted at the lowest legacy 802.11a/g rate so the all the STAs 120 in the wireless network 100 can set their NAV appropriately. Other fields include a Frame Control (FC) field 302 that provide frame control information; a Source Address (SA) field 308 that stores the identification of the sender of the message, which in this case is the AP; a Transmission Opportunity (TxOP) field 310 that specifies to the STAs the maximum duration for transmission; and a cyclic redundancy check (CRC) field 320 to allow recipients of the message to determine whether the message has been properly received Once each of the STAs 120 that are listed in the TRM 300 receives the TRM 300, they each respond with a sounding frame that may be used by the AP to determine the CSI. As those skilled in the art would know, multiple approaches may be used to provide an estimate of the CSI. For example, each of the STAs 120 listed in the TRM 300 may send a sounding frame in response receiving the TRM. The scheduler may then estimate the joint channel to the desired STAs from the received sounding frames. In this case, it is assumed that the channel is reversible, which means the uplink channel condition is similar to the downlink channel condition.

Figure 4:
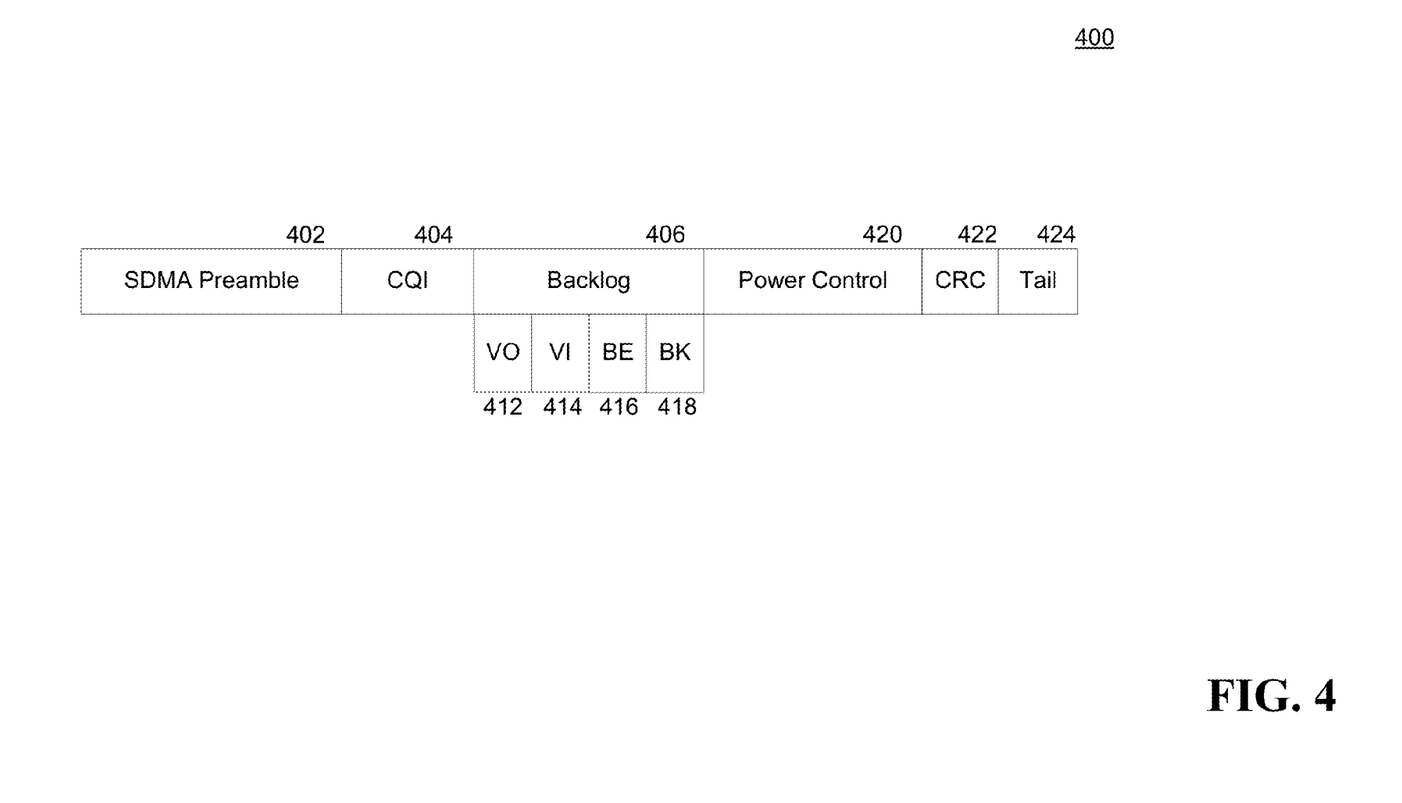
FIG. 4 is a diagram of an example format of a sounding frame that may be sent in response to the TRM frame of FIG. 3.

FIG. 4 illustrates a sounding frame format 400 that may be sent by the STAs in response to the request from the AP. The sounding frame 400 includes an SDMA preamble portion 402, the length of which is determined by the spatial stream allocation. The preamble allows the AP to determine path loss. In order for the STA to report its measured channel quality, the sounding frame format 400 provides a Channel Quality Indicator (CQI) field 404, which contains an average of the received SNR for all receive antennas and tones based on a received RSDMA or TRM message at the STA. The information contained in the CQI field 404 enables the scheduler to estimate the post detection SINR and assign appropriate transmission rates for responding STAs. As known by those skilled in the art, interference and noise may be determined by the STA measuring a level of ambient noise surrounding the receiver during a quiet period.

The sounding frame 400 includes an uplink traffic backlog field 406 that may enable the AP to schedule uplink transmissions by facilitating the scheduler in creating a schedule that maximizes the use of resources, thereby optimizing performance of the MAC protocol. In one aspect, the uplink traffic backlog is presented on a per class basis, and VO (voice), VI (video), BE (best effort), and BK (background) fields 412-418 denote four classes.

Further, the sounding frame 400 includes a power control field 420 that may be used by the STA to provide feedback to allow the AP to increase or decrease the amount of power at which transmissions occur from the AP to the particular STA.

A CRC field 422, which may be used by the AP for error detection and correction; and a tail field 424, which may be used to fill the length of the frame as needed is also included.

In another example of a request/response approach, the AP may request that STAs transmit information regarding a metric of their operation in addition to the CQI that the scheduler may use to determine a transmissions schedule. As discussed, for example, the metric may include rate requirements for the traffic to be transmitted on the STA, based on a quantity of data as well as QoS requirements. The scheduler may also consider such information as the channel quality between the AP and the STAs. The consideration may include path loss, thermal noise, and power amplification distortion. In one aspect of the determination of scheduling, power requirements of each of the STAs may also be considered to attempt to efficiently schedule transmissions. The response message in the second example of the request/response pair is referred to as an Request SDMA (RSDMA) message that is broadcast to all STAs through the use of a special address.

Figure 5:
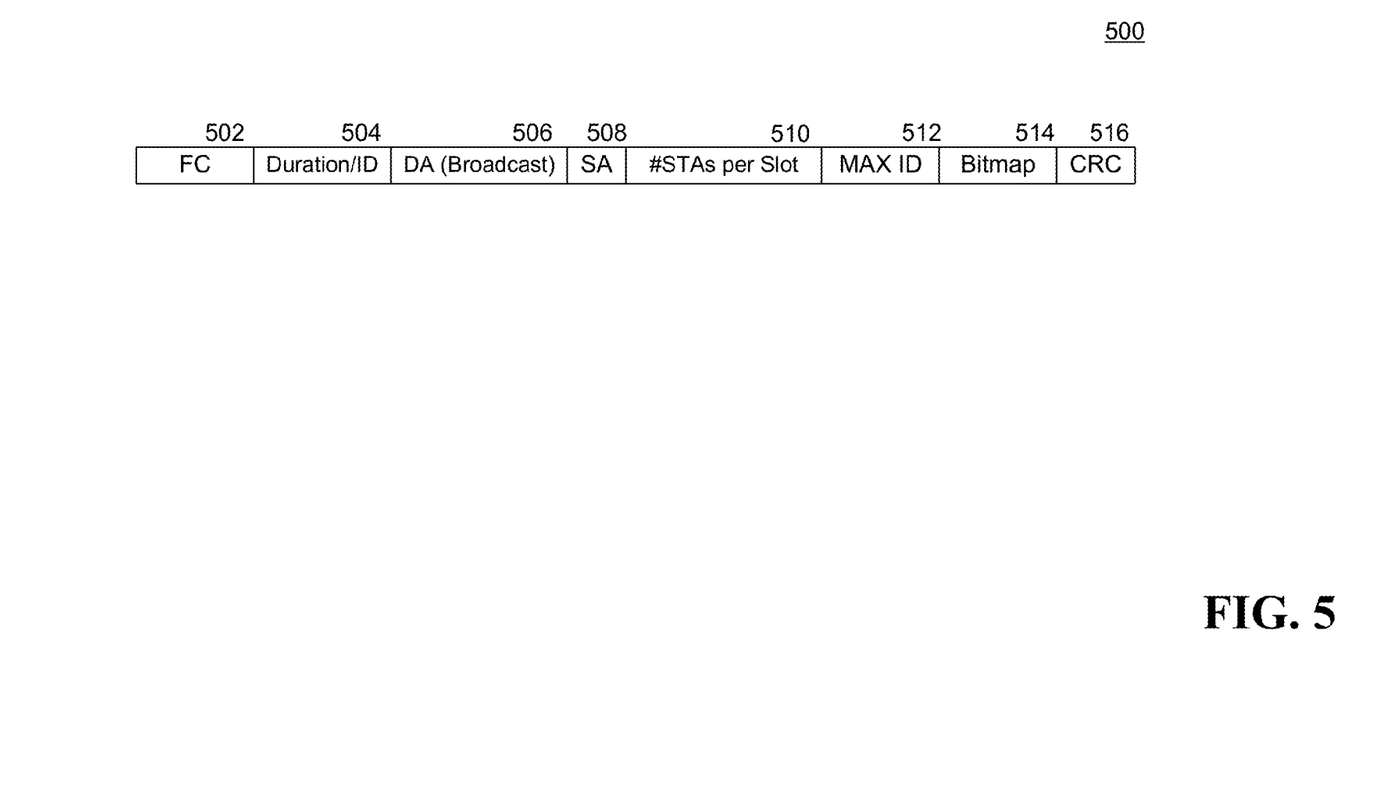
FIG. 5 is a diagram of an example format of a Request SDMA (RSDMA) frame that may be used in the operation of the downlink/uplink SDMA scheduler.

An example RSDMA message 500 is illustrated in FIG. 5. Although one example format is disclosed herein, as those skilled in the art will readily appreciate, the format may be changed depending on the particular application. In one aspect of the disclosure, the RSDMA message 500 is based on an IEEE 802.11 frame format and includes a Frame Control (FC) field 502 that provide frame control information; a Duration/ID field 504 that indicates the length of the message; a Destination Address (DA) field 506 for storing the destination address of the message, which as indicated above is the broadcast address; a Source Address (SA) field 508 that stores the identification of the sender of the message, which in this case is the AP; and a cyclic redundancy check (CRC) field 516 to allow recipients of the message to determine whether the message has been properly received. In addition to these fields, which are used for the transmission of the RSDMA message in the network, the RSDMA message 500 includes fields related to communicating parameters to the STAs for an uplink SDMA transmission.

For example, as the RSDMA message is used to inform STAs the parameters needed by each STA to effect an SDMA communication, the RSDMA message 500 may include a number of stations (#STAs) per slot field 510 that indicates the number of STAs that may request access to the network. The number of slots that are opened for request message transmission is determined by both the number of stations per slot parameter and the number of STAs that are supposed to respond to the RSDMA message.

Figure 6:
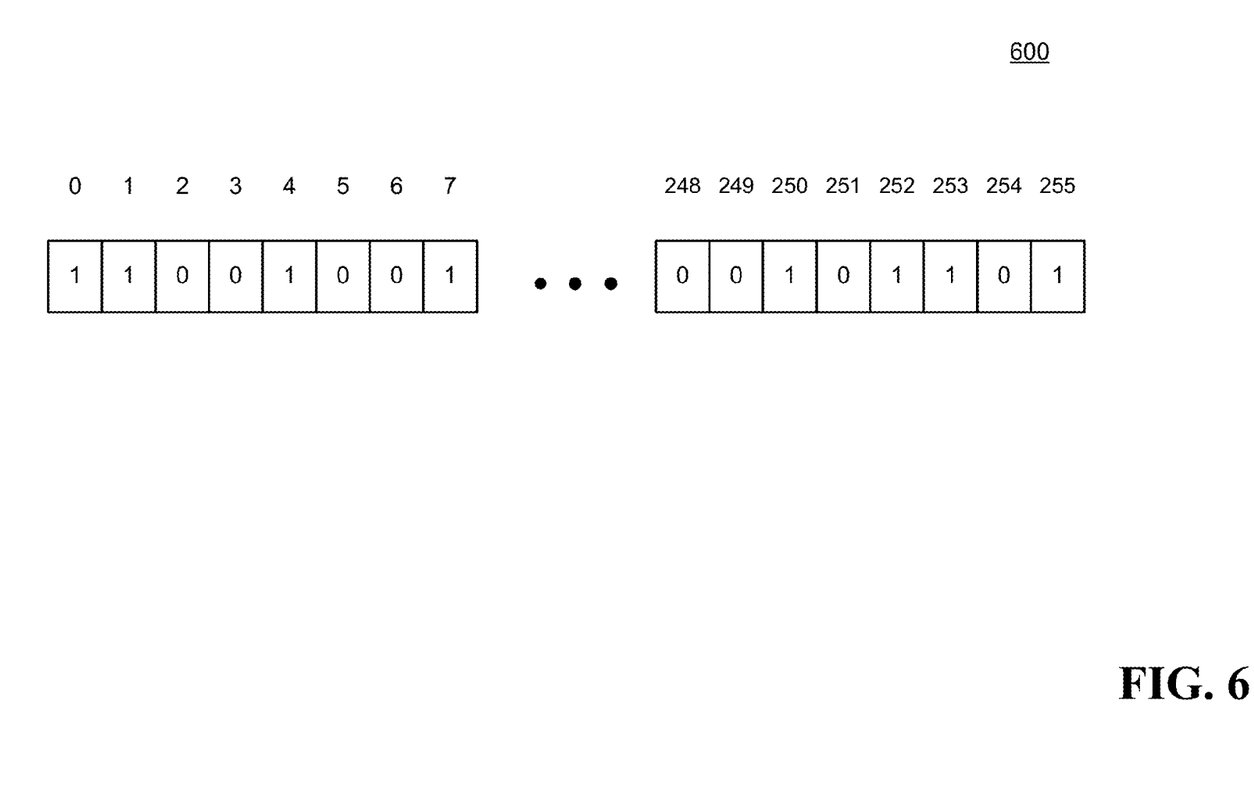
FIG. 6 is a diagram of an example format of a bitmap field contained in the RSDMA frame of FIG. 5.

The RSDMA message 500 also include a bitmap field 514 that is a mask to identify the STAs that need to respond to the RSDMA. FIG. 6 illustrates an example configuration 600 of the bitmap field 514 in the RSDMA message format 500. In the example configuration 600, the bitmap indicates that the STAs with an RTSMA-ID of 0, 1, 4, 7 . . . 250, 252, 253 and 255 are active and should respond to the RSDMA.

In one aspect of the disclosure, each STA is assigned an RTSMA-ID during its association with the AP. The RTSMA-ID may be recycled when a STA disassociates. The value of the RTSMA-ID is based on a maximum number of STAs that may be supported in an uplink SDMA transmission session. For example, in an uplink SDMA transmission session that can support up to 256 nodes, the RTSMA-ID is an 8-bit value. In this case, for ease of implementation, the RTSMA-ID may simply be made to be the least significant byte of the two-byte association ID (AID) that is assigned to each STA by the AP during the association process under the IEEE 802.11 standard.

The RSDMA message format 500 also includes a Max ID field 512 that indicates the highest RTSMA-ID of the STA that is to respond to the RSDMA. This value is used to optimize the size of the bitmap field 514, which has a maximum size of 256-bits in one aspect of the disclosure.

Figure 7:
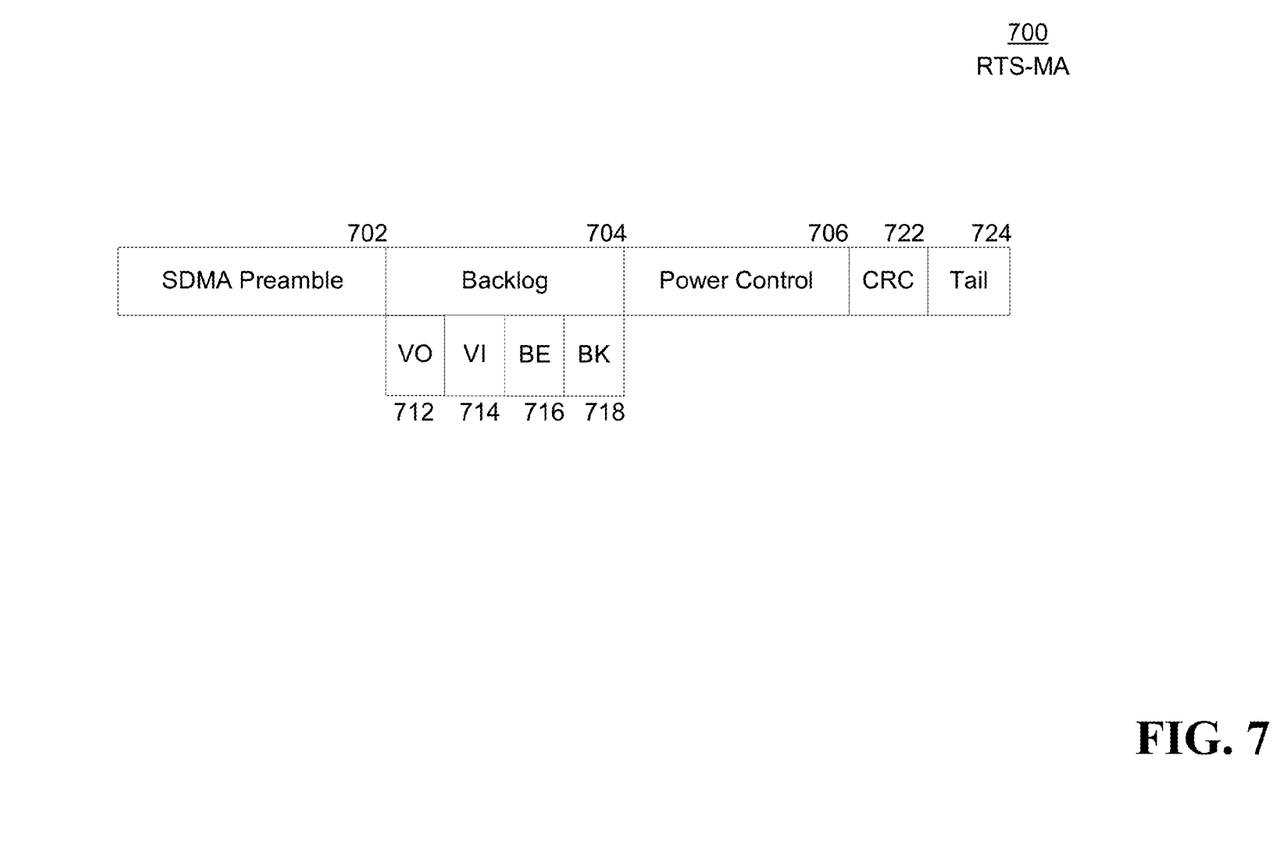
FIG. 7 is a diagram of an example format of a Request To Send-Multiple Access (RTS-MA) frame that may be used in the operation of the downlink/uplink SDMA scheduler.

For the STAs identified in a RSDMA message, it will respond with a message referred to as a Request To Send-Multiple Access (RTS-MA) message. An example of an RTS-MA message format 700 is illustrated in FIG. 7. The RTS-MA message may also be used by the AP to estimate the range of an STA as well as determine the amount of data each STA has to send. In one aspect of the disclosure, the AP may require all RTS-MAs to be sent with extended cyclic prefixes to enable accurate ranging estimation.

The RTS-MA message 700 also includes an SDMA preamble portion 702. In one aspect of the disclosure, the length of the SDMA preamble portion 702 is determined by the spatial stream allocation specified by the AP. The RTS-MA frame 700 includes an uplink traffic backlog field 704. The information contained in the uplink traffic backlog field 704 enables the AP to schedule uplink traffic epochs by informing the AP of the buffer status of the STA. In one aspect of the disclosure, the buffer information of the STA contained in the uplink traffic backlog is presented on a per class basis, including a VOice (VO) field 712, a VIdeo (VI) field 714, a Best Effort (BE) field 716, and background (BK) field 718.

The RTS-MA frame 700 also includes a power control field 706. The transmit power information contained in the power control field 706 is provided by the STA so that the AP 302 can adjust the power of its transmissions to the STA.

The RTS-MA frame 700 further includes a CRC field 722 that may be used for error correction, and a tail field 724 is also included to ensure the RTS-MA frame 700 is of a certain size.

FIG. 8 is a conceptual block diagram illustrating an example of the signal processing modules of a wireless node 800 that may be used to implement the various aspects of the scheduler. The wireless node includes a Media Access Control (MAC) processor 872 that receives data from a data source and returns data to a data sink. Those skilled in the art would understand that the MAC processor 872 may be configurable to control access to the medium. In one aspect of the MAC processor 872, the processor may be compliant with the IEEE 802.11 standard in generating and decoding MAC frames that may be used with a shared medium. The data source and data sink represent data coming from and going to, respectively, the layers above the MAC layer, such as the transport layer or the application layer. The MAC processor 872 operates with a transmit chain 800a in the wireless node 800 to transmit, and a receive chain 800b to receive, MAC frames. The transmit chain 800a and the receive chain 800b are part of the PHY layer, which provides physical signal and control, and may be implemented in a variety of approaches.

Turning to the transmit chain 800a, in a transmit mode, a TX data processor 802 may be used to receive data from the data source through the MAC processor 872 and encode (e.g., Turbo code) the data to facilitate forward error correction (FEC) at the receiving node. The encoding process results in a sequence of code symbols that may be blocked together and mapped to a signal constellation by the TX data processor 802 to produce a sequence of modulation symbols. The TX data processor 802 may include one or more memory elements to act as a buffer during processing in the transmit chain. The memory may be implemented in a variety of hardware as known by those skilled in the art.

In wireless nodes implementing OFDM, the modulation symbols from the TX data processor 802 may be provided to an OFDM modulator 804. The OFDM modulator 804 splits the modulation symbols into parallel streams. Each stream is then mapped to an OFDM subcarrier and then combined using an Inverse Fast Fourier Transform (IFFT) to produce a time domain OFDM stream.

A TX spatial processor 806 performs spatial processing on the OFDM stream. This may be accomplished by spatially precoding each OFDM stream and then providing each spatially precoded stream to a different antenna 810 via a transceiver 808. Each transceiver 808 modulates an RF carrier with a respective precoded stream for transmission over the wireless channel. In one aspect of the disclosure, the precoding may be performed on a per-tone basis using an iterative process for a target SINR.

Turning to the receive chain 800b, in a receive mode, each transceiver 808 receives a signal through its respective antenna 810. Each transceiver 808 may be used to recover the information modulated onto an RF carrier and provide the information to a RX spatial processor 820.

The RX spatial processor 820 performs spatial processing on the information to recover any spatial streams destined for the wireless node 800. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 800, they may be combined by the RX spatial processor 820.

In wireless nodes implementing OFDM, the stream (or combined stream) from the RX spatial processor 820 is provided to an OFDM demodulator 822. The OFDM demodulator 822 converts the stream (or combined stream) from time-domain to the frequency domain using a Fast Fourier Transform (FFT). The frequency domain signal comprises a separate stream for each subcarrier of the OFDM signal. The OFDM demodulator 822 recovers the data (i.e., modulation symbols) carried on each subcarrier and multiplexes the data into a stream of modulation symbols.

A RX data processor 824 may be used to translate the modulation symbols back to the correct point in the signal constellation. Because of noise and other disturbances in the wireless channel, the modulation symbols may not correspond to an exact location of a point in the original signal constellation. The RX data processor 824 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 824 then uses the sequence of code symbol LLRs in order to decode the data that was originally transmitted before providing the data to the MAC layer. The RX data processor 824 may include one or more memory elements to act as a buffer during the processing in the receiver chain.

Wireless node 800 also includes a scheduler 852 that will perform downlink and uplink SDMA scheduling as described herein. In one aspect of the scheduler 852, the scheduler 852 is coupled to RX data processor 824 through the MAC processor 872 to be able to receive information, metrics, and measurements that it will need to perform its calculations. For example, in various aspects of the operation of the scheduler 852, sounding frames are used to measure the channel state information between two devices such as an AP and a STA. The scheduler 852 may use the receiver chain to retrieve the information it needs related to the sounding frame measurements once the MAC processor 872 has extracted the necessary information.

Conversely, on the transmit chain, the scheduler 852 is coupled to the TX data processor 802 through the MAC processor 872 to be able to transmit the various parameters to other wireless nodes to effect the scheduled communication. For example, the scheduler 852 may transmit power allocation, MCS and/or spatial stream assignment parameters to one or more other wireless nodes with one or more of the messages discussed previously through the use of the transmit chain, as generated by the MAC processor 872. The scheduler 852 is also able to used to control the generation and transmission of the previously described request messages as part of the scheduling process.

Figure 9:
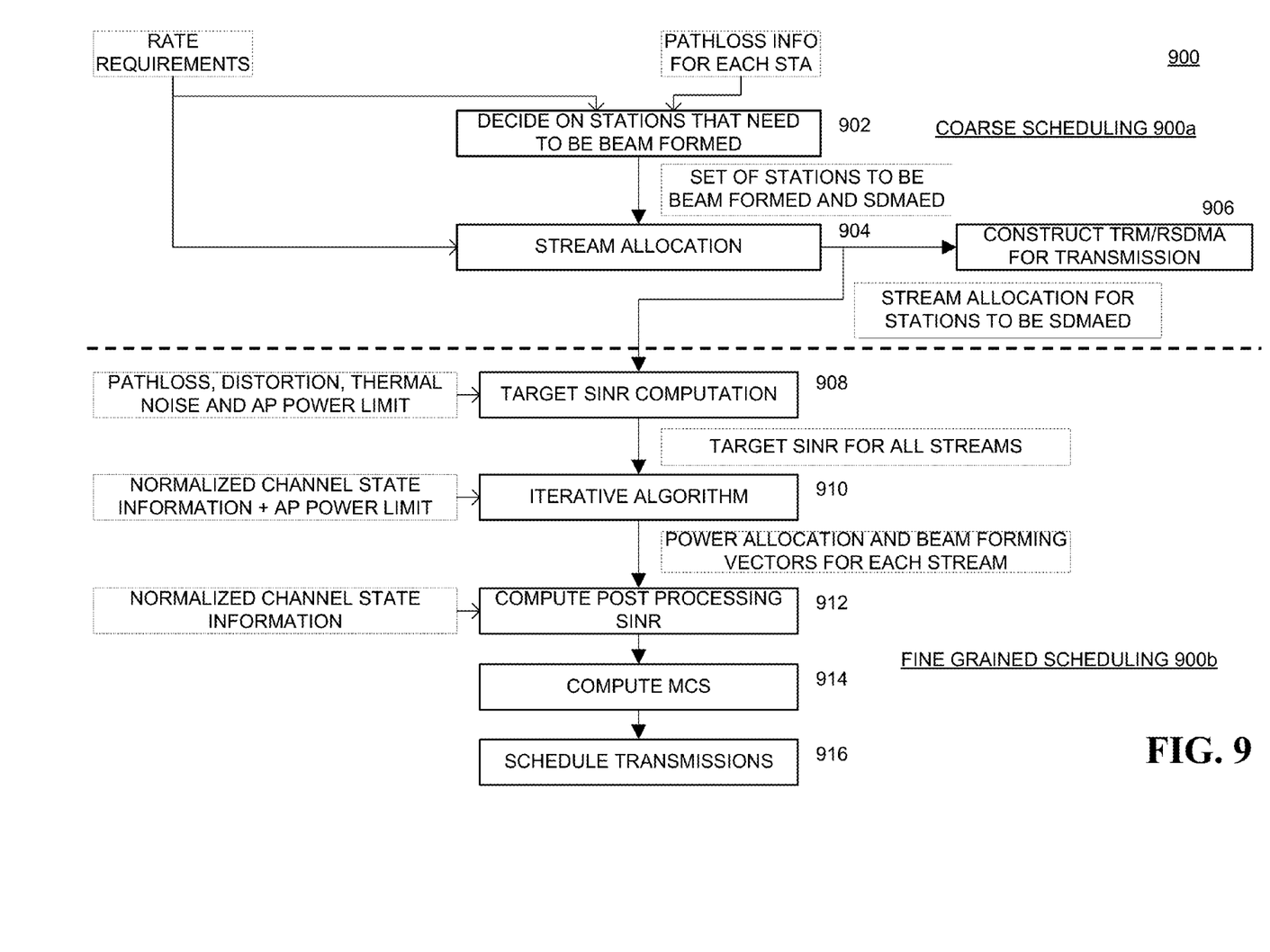
FIG. 9 is a flow diagram further illustrating the operation of the downlink/uplink SDMA scheduler as described in FIG. 2 as a dual-stage downlink/uplink SDMA scheduler that provides coarse and fine grained scheduling stages.

FIG. 9 illustrates a dual-stage scheduler operating process 900 configured in accordance to one aspect of the disclosure for scheduling downlink/uplink SDMA transmissions that may be implemented by the scheduler 852. The data/information used in the execution of the steps is indicated by text in dotted lines.

The coarse scheduling stage begins with step 902, where the STAs that need to be beamformed are identified. In other words, the scheduler 852 will determine which STAs will transmit using beamforming. In one aspect of the disclosure, the beamforming STAs may be chosen based on information, or metric, related to each STA. For example, the scheduler 852 may select STAs based on initial rate requirements of each STA. In one aspect of the disclosure, initial rate requirements may be determined based on the instantaneous buffer status of the downlink/uplink flows. The initial rate requirements may also be based on the mean data rates from each of the data flows of the system, which may be pursuant to the defined classes of IEEE 802.11e, such as those defined in the standard to implement different quality of service requirements for those classes of data. STAs may also be selected based on pathloss for each STA.

Other considerations for determining timing for communicating with the STAs that may support SDMA based on proximity of such nodes to the apparatus. Channel conditions may also be used to determine which nodes may support SDMA. The number of antennas on each node may also be used to determine whether beamforming may be used. Once the scheduler 852 has determined which STAs are going to be beamformed, operation will continue with step 904.

In step 904, the scheduler 852 may allocate spatial streams to the STAs that will transmit using SDMA, which in this case are STAs that are not to be beamformed. In one aspect of the disclosure, the stream allocation is based on the initial rate requirement of these STAs. The stream allocation may also be based on the number of transmit and receive antennas on the AP and each of the STAs. Thus, for example, if the AP has 4 transmit antennas and there are 2 STAs, each with 2 receive antennas, the scheduler 852 can allocate up to 2 streams for each STA. If the AP only has 2 transmit antennas, then the scheduler 852 can only allocate 1 stream for each STA.

In step 906, a request spatial division multiple access (RSDMA) message, also referred to as a frame, is constructed and transmitted by the AP. In one aspect of the disclosure, and as explained herein, the RSDMA message will include an allocation of streams for the STAs that will communicate using SDMA. The scheduler 852 may also transmit a Training Request Message (TRM) to request sounding frames from the STAs during 906. After the sounding frames have been received, the buffer status of all responding STAs is known. Also, the scheduler 852 will have knowledge of the channel to each of these STAs. This information is necessary for using the right modulation coding scheme for robust transmission/reception.

Once the coarse scheduling stage has completed with step 906, operation continues with step 908, where the fine grained scheduling begins and a target SINR computation process occurs to determine target, per-tone SINRs for all streams. In one aspect of the disclosure, the target SINR computation may be based on the path loss experienced by each of the STAs, any power amplification distortion, thermal noise and/or power limits of the AP. The path loss may be determined by many means, including use of sounding frames or preambles received from the STAs. Once the target SINR computation has completed, operation continues with step 910.

In step 910, power allocation for each stream is determined along with the beam-forming vectors. In one aspect of the disclosure, normalized channel state information, which includes path loss, thermal noise levels and power amplification distortion, is used along with the target SINRs computed in step 908 to determine the power allocation and beam-forming vectors in an iterative fashion. The scheduler 852 may also take into account the power limit of the AP during this process.

In step 912, post processing SINR is computed. In one aspect of the disclosure, normalized channel state information, which includes path loss, thermal noise levels and power amplification distortion, is used along with the power allocation and beam-forming vectors for each stream as determined in step 910.

In step 914, a modulation and coding scheme (MCS) is then determined for each of the STAs. In one aspect of the disclosure, the selection of the MCS is based on the post processing SINRs determined in step 912.

In step 916, once the power allocation and beamforming vectors, along with other computed and measured metrics such as the MCS for each stream, has been determined, the scheduler 852 may transmit and communicate with each of the STAs using those parameters. It should be noted that the metrics referred to herein may include not only those related to the STAs, but also those related to the AP. It should be further noted that although the operation of the scheduler 852 has been described in the context of being in the AP, the various aspects of the disclosure are fully applicable to operation of the scheduler 852 in an STA. Thus, no limitation should be placed on the actual location of operation of the scheduler 852.

Figure 10:
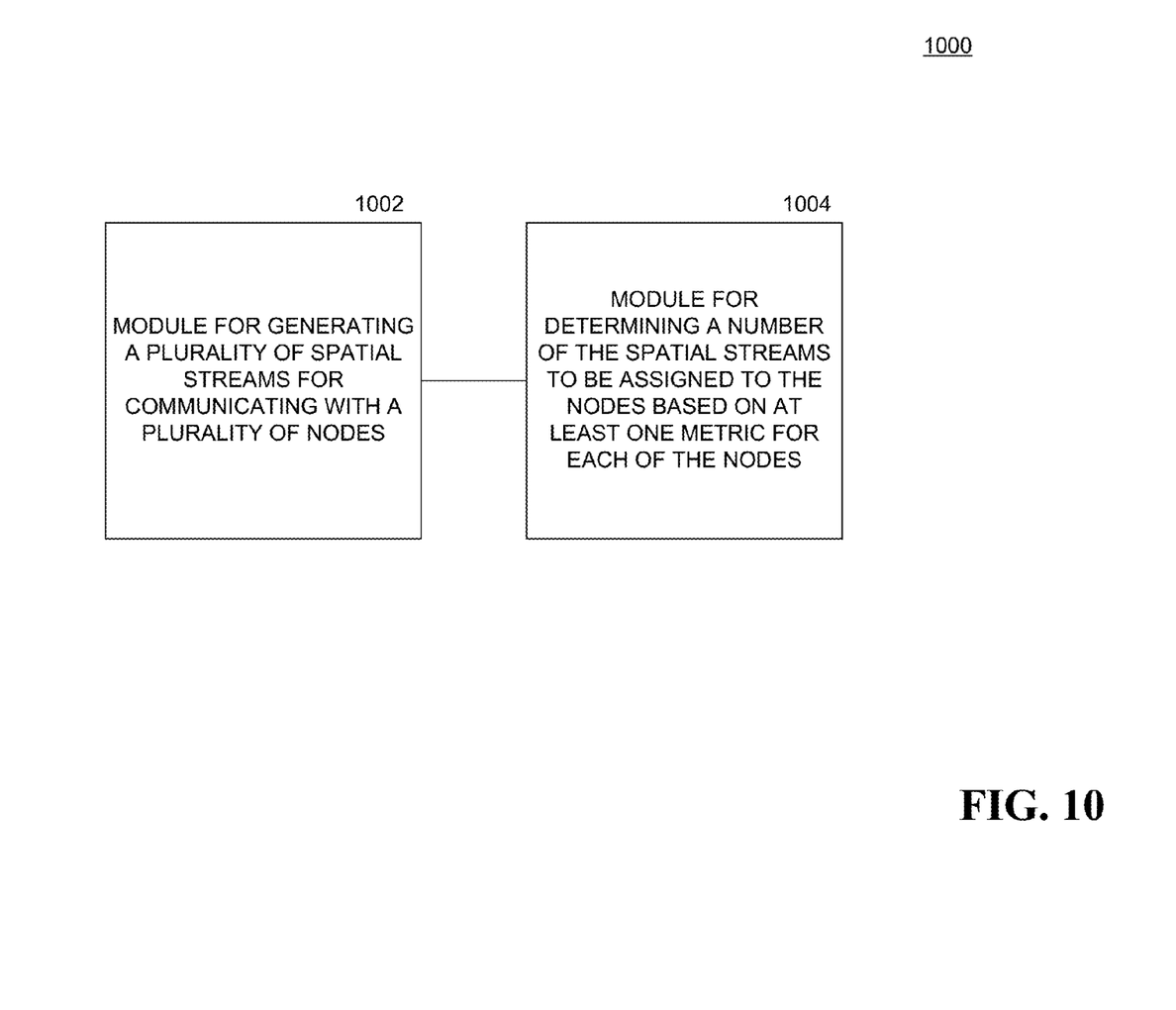
FIG. 10 is a block diagram illustrating an example of the functionality of the downlink/uplink SDMA scheduler apparatus.

FIG. 10 is a diagram illustrating the functionality of an apparatus 1000 in accordance with one aspect of the disclosure. The apparatus includes a module 1002 for generating a plurality of spatial streams for communicating with a plurality of nodes, and a module 1004 for determining a number of the spatial streams to be transmitted to each the nodes based on at least one metric for each of the nodes.

Those of skill will appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus comprising:
a processing system configured to:
generate a plurality of spatial streams for communicating with a plurality of access terminals; and
determine an allocation of the plurality of spatial streams to the plurality of access terminals based on at least one metric for each access terminal of the plurality of access terminals, wherein determining the allocation comprises determining a first number of the plurality of spatial streams to be allocated to a first access terminal of the plurality of access terminals based on a first antenna configuration of the first access terminal, wherein the processing system is further configured to split a high data rate signal for the first access terminal into a second number of lower data rate streams, wherein the second number is equal to the first number, and wherein the lower data rate streams are allocated to the first access terminal.

2. The apparatus of claim 1, wherein the processing system is further configured to determine a first subset of the plurality of access terminals that communicate via beam forming and a second subset of the plurality of access terminals that are configurable to communicate via spatial division multiplexing.

3. The apparatus of claim 2, wherein the processing system is further configured to determine timing for communicating with the second subset based on a number of antennas on each access terminal of the second subset.

4. The apparatus of claim 2, wherein the processing system is further configured to determine timing for communicating with the second subset based on a number of antennas supportable by the processing system.

5. The apparatus of claim 1, wherein determining the allocation further comprises determining an allocation of spatial streams of the plurality of spatial streams for each access terminal of other access terminals of the plurality of access terminals based on one or more antenna configurations of the other access terminals of the plurality of access terminals.

6. The apparatus of claim 1, wherein the processing system is further configured to determine a particular number of spatial streams to be transmitted to each access terminal of the plurality of access terminals based on a third number of antennas supportable by the processing system, wherein the processing system is a base station, and wherein the first access terminal is a mobile terminal.

7. The apparatus of claim 1, wherein the first number of the plurality of spatial streams to be allocated to the first access terminal is further based on a quality of a channel between the first access terminal and an access point associated with the processing system.

8. The apparatus of claim 1, wherein the first antenna configuration indicates a number of antennas at the first access terminal.

9. The apparatus of claim 1, wherein determining the allocation further comprises determining a third number of the plurality of spatial streams to be allocated to a second access terminal of the plurality of access terminals based on a second antenna configuration of the second access terminal.

10. The apparatus of claim 1, wherein the processing system is a transmitting node for downlink communications and the plurality of access terminals are receiving nodes for downlink communications.

11. The apparatus of claim 1, wherein the processing system is a receiving node for uplink communications and the plurality of access terminals are transmitting nodes for uplink communications.

12. The apparatus of claim 1, wherein the processing system supports multiple input multiple output technology.

13. The apparatus of claim 1, wherein each stream of the plurality of lower data rate streams has a different spatial signature.

14. An apparatus comprising:
means for generating a plurality of spatial streams for communicating with a plurality of access terminals;
means for determining an allocation of the plurality of spatial streams to the plurality of access terminals based on at least one metric for each access terminal of the plurality of access terminals, wherein the means for determining the allocation comprises means for determining a first number of the plurality of spatial streams to be allocated to a first access terminal of the plurality of access terminals based on an antenna configuration of the first access terminal; and
means for splitting a high data rate signal for the first access terminal into a second number of lower data rate streams, wherein the second number is equal to the first number, and wherein the lower data rate streams are allocated to the first access terminal.

15. The apparatus of claim 14, further comprising:
means for determining a first subset of the plurality of access terminals that communicate via beam forming; and
means for determining a second subset of the plurality of access terminals that are configurable to communicate via spatial division multiplexing.

16. The apparatus of claim 14, wherein the means for determining the allocation further comprises means for determining an allocation of spatial streams of the plurality of spatial streams for a second access terminal of the plurality of access terminals based on a second antenna configuration of the second access terminal.

17. The apparatus of claim 14, further comprising means for determining a number of spatial streams of the plurality of spatial streams to be transmitted to each access terminal of the plurality of access terminals based on a number of antennas that are supportable by the means for generating the plurality of spatial streams.

18. The apparatus of claim 14, wherein the means for generating is a transmitting node for downlink communications and the plurality of access terminals are receiving nodes for downlink communications.

19. The apparatus of claim 14, wherein the means for generating is a receiving node for uplink communications and the plurality of access terminals are transmitting nodes for uplink communications.

20. The apparatus of claim 14, wherein the means for generating supports multiple input multiple output technology.

21. A method comprising:
generating a plurality of spatial streams for communicating with a plurality of access terminals;
determining an allocation of the plurality of spatial streams to the plurality of access terminals based on at least one metric for each access terminal of the plurality of access terminals, wherein determining the allocation comprises determining a first number of the plurality of spatial streams to be allocated to a first access terminal of the plurality of access terminals based on an antenna configuration of the first access terminal; and
splitting a high data rate signal for the first access terminal into a second number of lower data rate streams, wherein the second number is equal to the first number, and wherein the lower data rate streams are allocated to the first access terminal.

22. The method of claim 21, wherein determining the allocation further comprises determining a third number of the plurality of spatial streams to be allocated to a second access terminal of the plurality of access terminals based on a second antenna configuration of the second access terminal.

23. The method of claim 21, further comprising communicating with the plurality of access terminals by transmitting the spatial streams through a plurality of antennas, and wherein a second number of spatial streams to be transmitted to each access terminal of the plurality of access terminals is based on a third number of antennas.

24. The method of claim 21, wherein the plurality of access terminals are receiving nodes for downlink communications.

25. The method of claim 21, wherein the plurality of access terminals are transmitting nodes for uplink communications.

26. A non-transitory computer-program product for communication, comprising:
a machine-readable medium encoded with instructions executable by a processor to cause the processor to perform operations including:

generating a plurality of spatial streams for communicating with a plurality of access terminals;

determining an allocation of the plurality of spatial streams to the plurality of access terminals based on at least one metric for each access terminal of the plurality of access terminals, wherein determining the allocation comprises determining a first number of the plurality of spatial streams to be allocated to a first access terminal of the plurality of access terminals based on an antenna configuration of the first access terminal; and splitting a high data rate signal for the first access terminal into a second number of lower data rate streams, wherein the second number is equal to the first number, and wherein the lower data rate streams are allocated to the first access terminal.

27. The non-transitory computer-program product of claim 26, wherein the plurality of access terminals are receiving nodes for downlink communications.

28. The non-transitory computer-program product of claim 26, wherein the plurality of access terminals are transmitting nodes for uplink communications.

29. An access point comprising:
a plurality of antennas;
a processing system configured to:
generate a plurality of spatial streams for communicating with a plurality of access terminals; and
determine an allocation of the plurality of spatial streams to the plurality of access terminals based on at least one metric for each access terminal of the plurality of access terminals, wherein determining the allocation comprises determining a first number of the plurality of spatial streams to be allocated to a first access terminal of the plurality of access terminals based on an antenna configuration of the first access terminal, wherein the processing system is further configured to split a high data rate signal for the first access terminal into a second number of lower data rate streams, wherein the second number is equal to the first number, and wherein the lower data rate streams are allocated to the first access terminal; and a transceiver configured to communicate with the plurality of access terminals through the plurality of antennas.

30. The apparatus of claim 29, wherein determining the allocation further comprises determining a third number of the plurality of spatial streams to be allocated to a second access terminal of the plurality of access terminals based on a second antenna configuration of the second access terminal.

31. The apparatus of claim 30, wherein the first number does not equal the third number.

32. The apparatus of claim 31, wherein at least one spatial stream of the plurality of spatial streams is allocated to the first access terminal and no spatial streams are allocated to the second access terminal.

33. The access point of claim 29, wherein the processing system is a transmitting node for downlink communications and the plurality of access terminals are receiving nodes for downlink communications.

34. The access point of claim 29, wherein the processing system is a receiving node for uplink communications and the plurality of access terminals are transmitting nodes for uplink communications.

35. The access point of claim 29, wherein the processing system supports multiple input multiple output technology.

* * * * *